(12) United States Patent
Bugosh (10) Patent No.: US 7,055,646 B2
(45) Date of Patent: Jun. 6, 2006

(54) ELECTRIC POWER STEERING ASSEMBLY

(75) Inventor: Mark Bugosh, Sterling Heights, MI (US)

(73) Assignee: TRW Inc., Cleveland, OH (US)

( * ) Notice: Subject to any disclaimer, the term of this patent is extended or adjusted under 35 U.S.C. 154(b) by 376 days.

(21) Appl. No.: 10/121,233

(22) Filed: Apr. 12, 2002

(65) Prior Publication Data

US 2003/0192734 A1 Oct. 16, 2003

(51) Int. Cl.
*B62D 5/04* (2006.01)

(52) U.S. Cl. .................................................. 180/444
(58) Field of Classification Search ............... 180/443, 180/444; 74/409, 425, 440, 458, 388 PS
See application file for complete search history.

(56) References Cited

U.S. PATENT DOCUMENTS

| | | | | |
|---|---|---|---|---|
| 4,593,780 A | 6/1986 | Saito | ......................... | 180/79.1 |
| 4,735,271 A | 4/1988 | Shimizu | ...................... | 180/79.1 |
| 4,754,829 A | 7/1988 | Shimizu | ...................... | 180/79.1 |
| 4,765,426 A | 8/1988 | Shimizu | ...................... | 180/79.1 |
| 4,771,845 A | 9/1988 | Shimizu | ...................... | 180/79.1 |
| 4,784,234 A | 11/1988 | Naito et al. | ................. | 180/79.1 |
| 4,819,170 A | 4/1989 | Shimizu | ................ | 364/424.04 |
| 4,825,972 A | 5/1989 | Shimizu | ...................... | 180/79.1 |
| 4,837,692 A | 6/1989 | Shimizu | ................ | 364/424.05 |
| 4,841,790 A | 6/1989 | Williston et al. | ........... | 74/89.15 |
| 5,482,128 A | 1/1996 | Takaoka et al. | ............ | 180/79.1 |
| 5,711,396 A | 1/1998 | Joerg et al. | .................. | 180/444 |
| 5,921,344 A | 7/1999 | Boyer | ......................... | 180/444 |
| 5,957,236 A | 9/1999 | Kitazawa et al. | ............ | 180/444 |
| 6,129,171 A | 10/2000 | Takaoka | ....................... | 180/444 |
| 6,155,376 A | 12/2000 | Cheng | ......................... | 180/444 |
| 6,186,268 B1 | 2/2001 | Onodera et al. | ............. | 180/444 |
| 6,378,646 B1 * | 4/2002 | Bugosh | ....................... | 180/444 |

FOREIGN PATENT DOCUMENTS

| | | |
|---|---|---|
| GB | 2188891 | 10/1987 |
| JP | 97232 | 4/2001 |

* cited by examiner

Primary Examiner—Lesley D. Morris
Assistant Examiner—L. Lum
(74) Attorney, Agent, or Firm—MacMillan, Sobanski & Todd, LLC (57) ABSTRACT

This invention relates to an improved structure for a rack drive assembly adapted for use in a vehicle electric power steering assembly. The electric power steering assembly includes a steering member (32), a ball nut assembly (70), a bearing assembly (80) and an electric motor (60). The steering member (32) is disposed in a rack housing (30) and includes a rack portion (34) operatively connected to a vehicle steering wheel (12) and a screw portion (40) having an external thread convolution (42). The ball nut assembly (70) is operatively connected to the screw portion (40) of the rack portion (34) of the steering member (32) for effecting axial movement of the steering member (32) upon rotation of the vehicle steering wheel (12). The ball nut assembly (70) includes a rotor shaft (76) and a ball nut (72) fixed to the shaft (76) for rotation therewith. The ball nut (72) includes an outer surface (96) and the rotor shaft (76) includes an inner surface (114). The bearing assembly (80) is carried by the rotor shaft (76) for rotatably supporting the ball nut assembly (70) relative to the steering member (32). The electric motor (60) is operatively coupled to the rotor shaft (76) via a pulley assembly (82). The power steering assembly further includes an insulator (74) disposed between at least a portion of the outer surface (96) of the ball nut (72) and the inner surface (114) of the rotor shaft (76). The insulator (74) isolates the ball nut (72) from at least one of the pulley assembly (82) and the bearing assembly (80) to thereby reduce the noise in the ball nut assembly (70).

21 Claims, 4 Drawing Sheets

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, when this type of electric power steering assembly is actuated, undesirable noise can be produced from one or more of the associated components of the rack drive assembly. Thus, it would be desirable to provide an improved structure for a rack drive assembly of an electric power steering assembly which reduces noise in the assembly and yet is simple and inexpensive.

SUMMARY OF THE INVENTION

This invention relates to an improved structure for a rack drive assembly adapted for use in a vehicle electric power steering assembly. The electric power steering assembly includes a steering member, a ball nut assembly, a bearing assembly and an electric motor. The steering member is disposed in a rack housing and includes a rack portion operatively connected to a vehicle steering wheel and a screw portion having an external thread convolution. The ball nut assembly is operatively connected to the screw portion of the rack portion of the steering member for effecting axial movement of the steering member upon rotation of the vehicle steering wheel. The ball nut assembly includes a rotor shaft and a ball nut fixed to the shaft for rotation therewith. The ball nut includes an outer surface and the rotor shaft includes an inner surface. The bearing assembly is carried by the rotor shaft for rotatably supporting the ball nut assembly relative to the steering member. The electric motor is operatively coupled to the rotor shaft via a pulley assembly. The power steering assembly further includes an insulator disposed between at least a portion of the outer surface of the ball nut and the inner surface of the rotor shaft. The insulator isolates the ball nut from at least one of the pulley assembly and the bearing assembly to thereby reduce the noise in the ball nut assembly.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
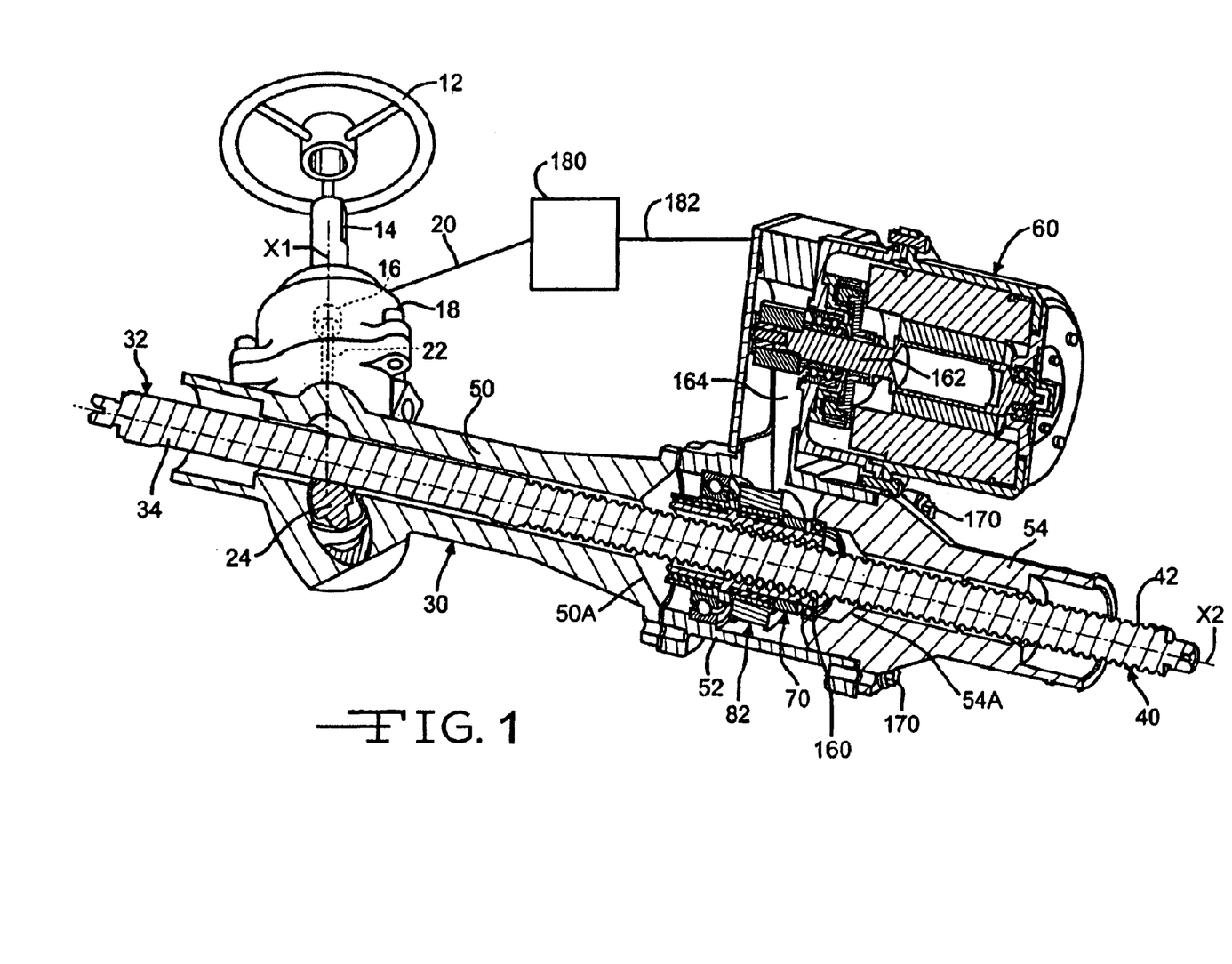
FIG. 1 is a sectional view of a portion of a first embodiment of a vehicle electric power steering assembly in accordance with the present invention.
Figure 2:
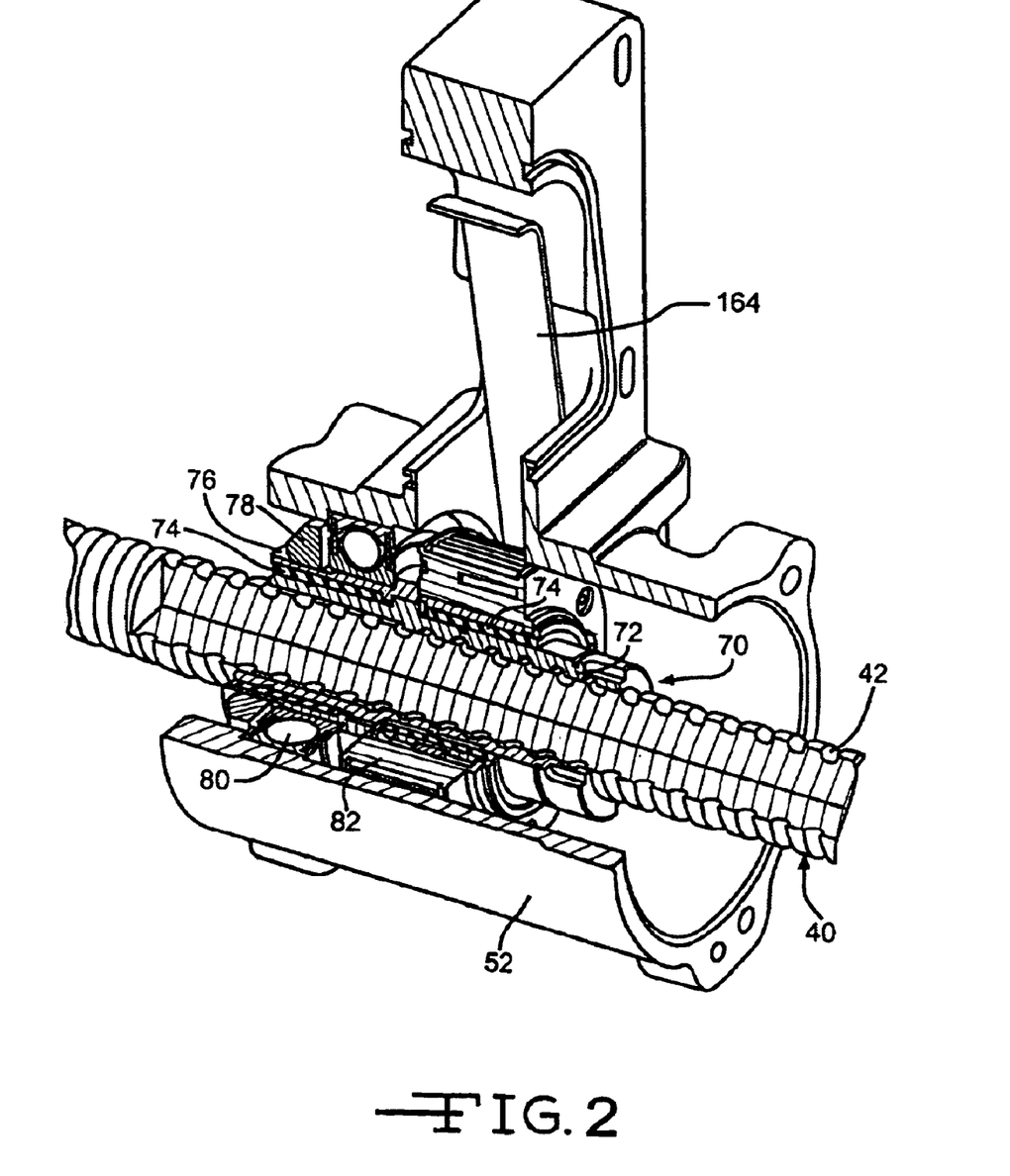
FIG. 2 is a view of a portion of the vehicle electric power steering assembly illustrated in FIG. 1.
Figure 3:
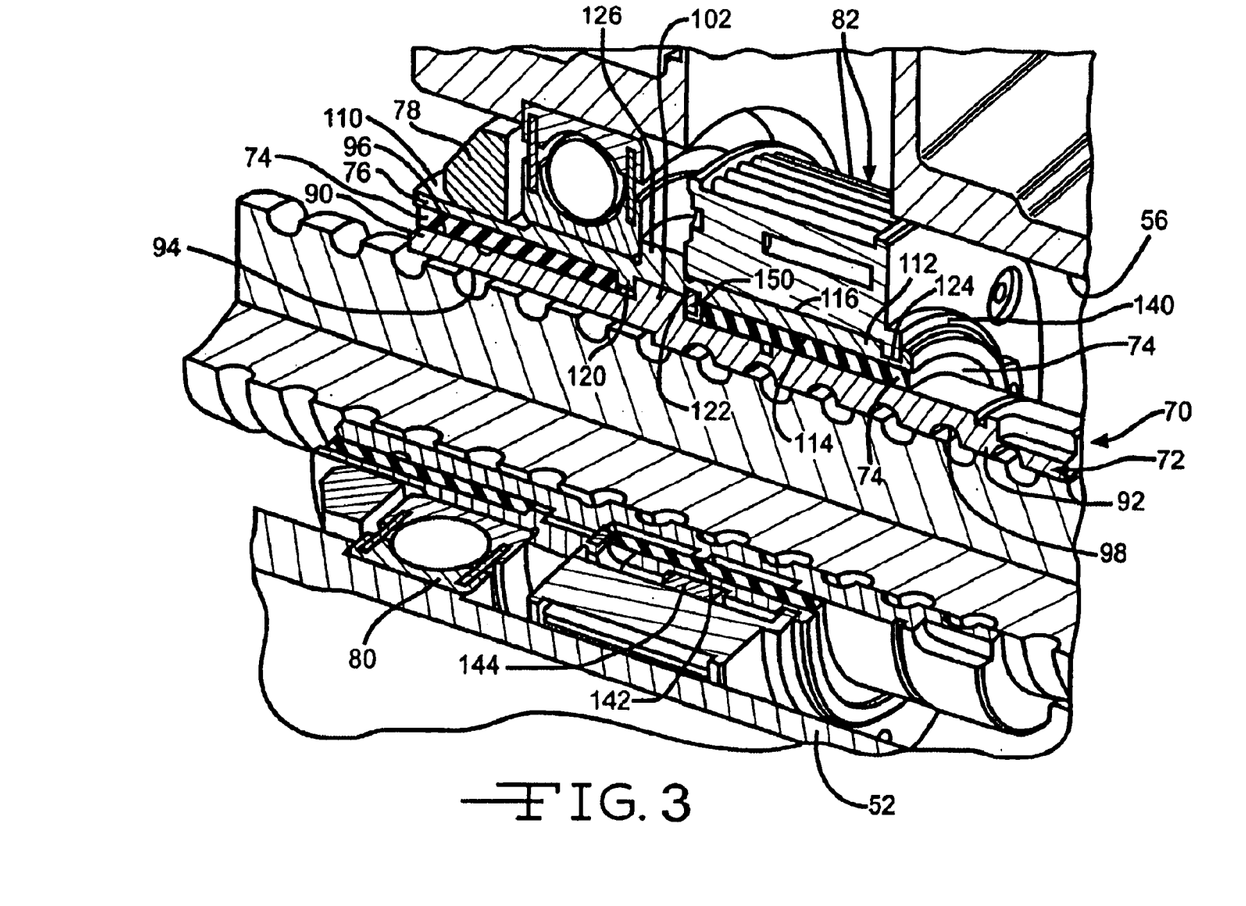
FIG. 3 is an enlarged sectional view of a portion of the vehicle electric power steering assembly illustrated in FIGS. 1 and 2.

Referring now to FIGS. 1–3, there is illustrated a first embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies.

The illustrated electric power steering assembly 10 includes a vehicle steering wheel 12 and a rotatable input shaft 14 which is operatively coupled in a manner not shown, to the steering wheel 12 for rotation therewith about a steering axis X1. A torque sensor 16 is located inside a pinion housing 18 and encircles the input shaft 12. The torque sensor 16 includes coils (not shown) which respond to the rotation of the input shaft 12 and which generate over electrical lines 20 an electrical signal indicative of the direction and magnitude of the applied steering torque.

A torsion bar 20 is provided to connect the input shaft 12 to a pinion 22 located inside the pinion housing 18. The torsion bar 20 twists in response to the steering torque applied to the steering wheel 12. When the torsion bar 20 twists, relative rotation occurs between the input shaft 12 and the pinion 22.

The pinion housing 18 is attached to a rack housing, indicted generally at 30. A linearly movable steering member 32 extends axially through the rack housing 30. The steering member 32 is linearly (or axially) movable along a rack axis X2. A rack portion 34 of the steering member 32 is provided with a series of rack teeth (not shown) which meshingly engage gear teeth (not shown) provided on the pinion 22. The steering member 32 further includes a screw portion 40 having an external thread convolution 42. The steering member 32 is connected with steerable wheels (not shown) of the vehicle through tie rods (not shown) located at the distal ends of the steering member 32. Linear movement of the steering member 32 along the rack axis X2 results in steering movement of the steerable wheels as is known manner.

The rack housing 30 has a generally cylindrical configuration and includes a first section 50, a second section 52 and a third section 54. The first section 50 is connected to the second section 52 by suitable means, such as for example by a plurality of bolts and nuts (not shown). Similarly, the second section 54 is connected to the third section 54 by suitable means, such as for example by a plurality of bolts and nuts (only the bolts shown in FIG. 1 by reference numbers 170). The first section 50 is provided with a radially enlarged end 50A, and the third section 54 is provided with a radially enlarged end 54A. The enlarged ends 50A and 54A of the respective sections 50 and 54 cooperate with the second section 52 to define an annular chamber 56. Alternatively, the structure of the rack housing 30 can be other than illustrated if so desired. For example, the rack housing 30 can include less than three sections or more than three sections if so desired.

The steering assembly 10 further includes an electric motor 60 which, as will be discussed below in detail, is drivably connected to a ball nut assembly, indicated generally at 70 for effecting axial movement of the steering member 32 upon rotation of the steering wheel 12. In the event of the inability of the electric motor 60 to effect axial movement of the steering member 32, the mechanical connection between the gear teeth on the pinion 24 and the rack teeth on the rack portion 34 of the steering member 32 permits manual steering of the vehicle. The ball nut assembly 70 is located in the chamber 56 of the rack housing 30 and encircles the screw portion 40 of the steering member 32. As best shown in FIGS. 2 and 3, the ball nut assembly 70 includes a ball nut 72, an insulator 74, and a rotor shaft 76. As will be discussed below, the ball nut 72 is fixed to the rotor shaft 76 for rotation therewith.

The ball nut 72 has oppositely disposed first and second end portions 90 and 92, respectively, and generally cylindrical inner and outer surfaces 94 and 96, respectively, extending between the end portions. The first end portion 90 of the ball nut 72 projects axially toward the end 50A of the first portion 50 of the rack housing 30. The second end portion 92 of the ball nut 72 projects toward the end 54A of the third portion 54 of the rack housing 30. The second end portion 92 is provided with a screw thread convolution 98 formed on the cylindrical inner surface 96 thereof. The ball nut 72 further includes a raised shoulder or flange 102 provided on the cylindrical outer surface 96 thereof for a purpose to be discussed below.

The rotor shaft 76 has oppositely disposed first and second end portions 110 and 112, respectively, and generally cylindrical inner and outer surfaces 114 and 116, respectively, extending between the end portions. The first end portion 110 of the rotor shaft 76 projects axially toward the end 50A of the first portion 50 of the rack housing 30 and is supported by a bearing assembly 80. In the illustrated embodiment, the bearing assembly 80 is a ball bearing or a journal bearing. The first end portion 110 further includes a raised shoulder 120 provided on the inner cylindrical surface 114 thereof.

The second end portion 112 of the rotor shaft 76 projects toward the end 54A of the third portion 54 of the rack housing 30. The second end portion 112 is provided with a first an annular groove or recess 122 formed in the cylindrical inner surface 114 thereof, and with a second annular groove 124 formed in the cylindrical outer surface 116 thereof. The rotor shaft 76 further includes a raised shoulder or flange 118 provided on the cylindrical outer surface 116 thereof for a purpose to be discussed below.

The bearing assembly 80 is disposed on the cylindrical outer surface 116 of first end portion 110 of the rotor shaft 76. To accomplish this in the illustrated embodiment, a spanner nut 78 screws onto threads 130 provided in the cylindrical outer surface 116 in the first end portion 110 of the rotor shaft 76. As the spanner nut 78 is tightened against the adjacent surface of the bearing assembly 80, the opposite surface of the bearing assembly 80 engages the associated surface of the shoulder 126 of the rotor shaft 76 and loads the bearing assembly 80. As will be discussed below, the bearing assembly 80 is operative to rotatably support the ball nut 72 relative to the steering member 32. Alternatively, other methods can be used to retain the bearing assembly 80 on the rotor shaft 76 and/or to rotatably support the ball nut 72 relative to the steering member 32. In the illustrated embodiment, the bearing assembly 80 is a ball bearing. Alternatively, other types of bearing assemblies can be used if so desired.

The electric power steering assembly 10 further includes a pulley assembly 82 disposed on the cylindrical outer surface 116 of the second end portion 112 of the rotor shaft 76. To accomplish this, one end of the pulley assembly 82 abuts the shoulder 126 of the rotor shaft 76 and a retaining ring 140 disposed in the groove 124 abuts the opposite second end of the pulley assembly 82. The rotor shaft 76 is secured to the pulley assembly 82 by a suitable means for rotation therewith. In the illustrated embodiment, the rotor shaft 76 includes a female keyway 142 which receives a male key 144 of the pulley assembly 82 in order to key to the rotor shaft 76 to the pulley assembly 82 for rotation therewith. Alternatively, other methods can be used to secure the rotor shaft 76 to the pulley assembly 82.

In the illustrated embodiment, the insulator 74 is disposed between selected adjacent surfaces of the ball nut 72 and the rotor shaft 76. In particular, in the illustrated embodiment, the insulator 74 is disposed between the cylindrical outer surface 96 of the first end portion 90 of the ball nut 72 and the cylindrical inner surface 114 of the first end portion 110 of the rotor shaft 76, and between the cylindrical outer surface 96 of the second end portion 92 of the ball nut 72 and the cylindrical inner surface 114 of the second end portion 112 of the rotor shaft 76. Preferably, the insulator 74 is formed from a suitable damping material and is molded in place between the ball nut 72 and the rotor shaft 76 during a molding process so as to fixedly secure the ball nut 72 to the rotor shaft 76 for rotation therewith. A suitable material for the insulator 74 is a rubber material, such as for example, a rubber from the nitrile rubber family. Preferably, the rubber is dead compound rubber and has a low durometer hardness Shore A. Alternatively, the insulator 74 can be formed from other suitable type of materials if so desired.

Figure 4:
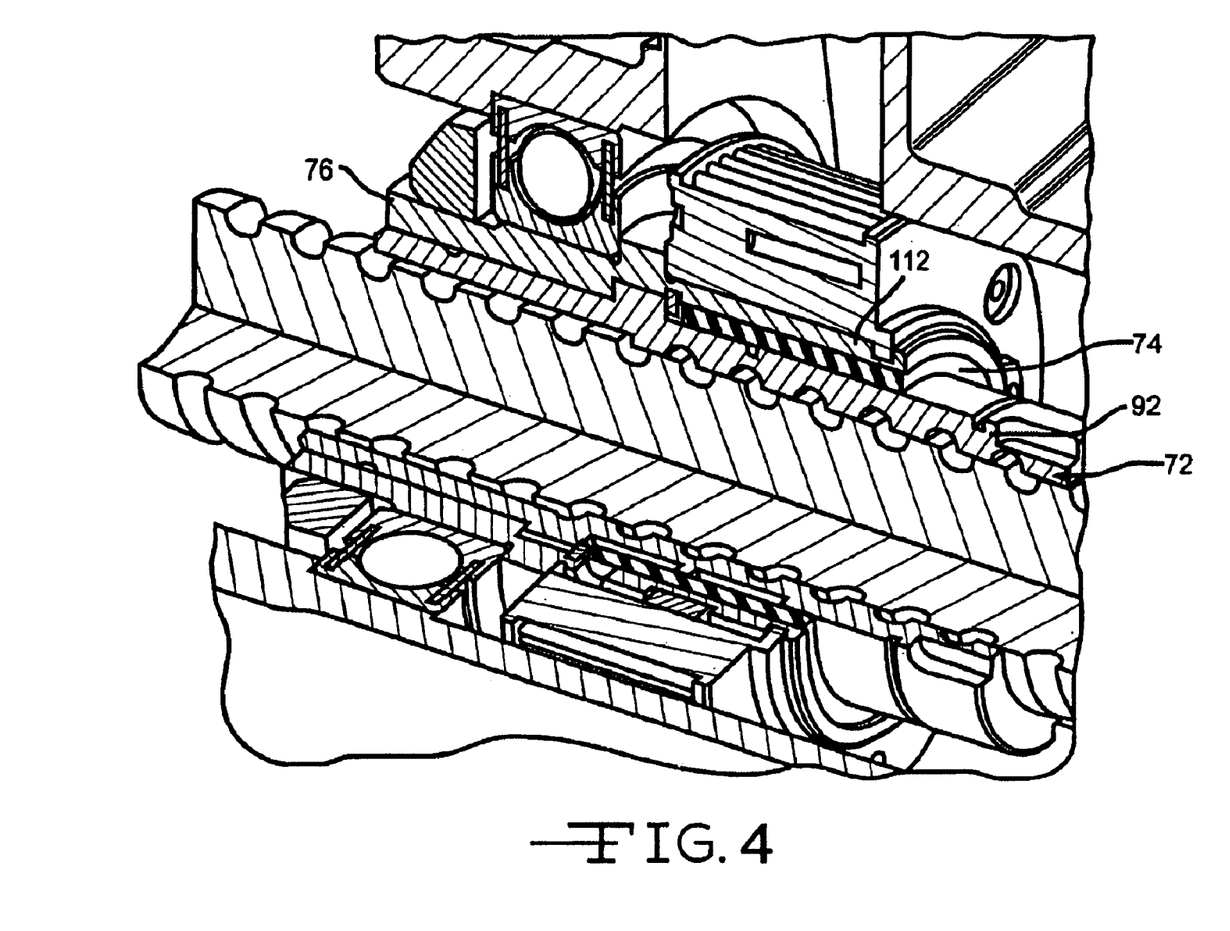
FIG. 4 is an enlarged view of a portion of a second embodiment of a vehicle electric power steering assembly in accordance with the present invention.

In the illustrated embodiment, the insulator 74 operatively fixes or couples the ball nut 72 to the rotor shaft 76 for rotation therewith. Also, as shown in FIG. 3, a retaining ring 150 is disposed in the groove 122 of the rotor shaft 76. The ring 150 is operative to capture the flange 52 of the ball nut 72 between itself and the shoulder 120 of the rotor shaft 76 to assist in connecting the ball nut 72 and the rotor shaft 76 together. Alternatively, the location and/or the composition of one or more of the ball nut 72, the insulator 74 and/or the rotor shaft 76 can be other than illustrated if so desired. For example, as shown in the embodiment illustrated in FIG. 4, the insulator 74 could be provided only between the second end portions 92 and 112 of the ball nut 72 and the rotor shaft 76, respectively, if so desired. If this is the case, then the rotor shaft 76 could also only include the second end portion 92 if so desired (not shown). In addition, the rotor shaft 76 and the ball nut 72 can be connected together by other suitable means if so desired.

The ball nut assembly 70 further includes a plurality of force-transmitting members 160. The force transmitting members 160 comprise balls (shown in FIG. 1), which are disposed between the internal screw thread convolution 98 of the ball nut 72 and the external thread convolution 42 on the screw portion 40 of the steering member 32. The balls 160 are loaded into the ball nut assembly 70 in a known manner. The ball nut assembly 70 further includes a recirculation passage (not shown) for recirculating the balls 160 upon axial movement of the steering member 32 relative to the ball nut assembly 70.

The electric motor 60 is supported relative to the rack housing 30 by suitable means. The electric motor 60 includes an output shaft 162 which is connected to a member 164 for rotation therewith. In the illustrated embodiment, the member 164 is a timing belt. The timing belt 164 is operatively connected to the pulley assembly 82. Thus, when the electric motor 60 is actuated, the timing belt 164 is rotated via the output shaft 162 so as to rotate the pulley assembly 82. The rotation of the pulley assembly 82 causes the ball nut assembly 72 to be rotated thereby effecting axial movement of the steering member 32 via the balls 160.

The steering assembly 10 further includes an electronic control unit or controller 180. The controller 180 is preferably secured to the rack housing 30 in a manner not shown. The controller 180 is electrically connected to the electric motor 60 by electrical lines 182 and is electrically connected by the electrical lines 20 to the torque sensor 16. The controller 180 is operable to receive electrical signals from the torque sensor 16 and to control the electric motor 60 in accordance with the received electrical signals. When steering torque is applied to the vehicle steering wheel 12, the input shaft 14 rotates about the axis X1. The direction and magnitude of the applied steering torque are sensed by the torque sensor 16. The torque sensor 16 outputs an electrical signal to the controller 180. The electric motor 60 is energized by a control signal transmitted to the electric motor 60 by the controller 180, and the motor output shaft 162 of the electric motor 60 is caused to rotate about a motor axis X3.

The rotating motor shaft 162 rotates the pulley assembly 82 via the belt 164 which in turn transmit the drive force of the electric motor 60 to the ball nut 72 of the ball nut assembly 70. The rotation of the ball nut 72 results in linear movement of the steering member 32. The balls 160 transmit the rotation force of the ball nut 72 to the rack portion 34 of the steering member 32. Because the ball nut 72 is fixed in position axially, the steering member 32 is driven to move axially in response, effecting steering movement of the steerable wheels of the vehicle. The electric motor 60 thus provides steering assist in response to the applied steering torque.

One advantage of the electric power steering assembly 10 of the present invention is that the insulator 74 is effective to dampen or reduce the noise in the ball nut assembly 70 by isolating the ball nut 72 from at least one of the pulley assembly 82 and the bearing assembly 80. Preferably, as illustrated in the preferred first embodiment of the present invention, the insulator 74 is effective to isolate the ball nut 72 from both the pulley assembly 82 and the bearing assembly 80.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:

a steering member disposed in a rack housing and including a rack portion operatively connected to a vehicle steering wheel and a screw portion;

a ball nut assembly operatively connected to said screw portion of said rack portion of said steering member for effecting axial movement of said steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to said steering member;

an electric motor operatively connected to said rotor shaft by a pulley assembly; and wherein an insulator is molded in place between said ball nut and said rotor shaft during a molding process so as to operatively couple said ball nut to said rotor therewith and wherein said insulator is disposed between said outer surface of said ball nut and said inner surface of said rotor shaft to thereby isolate said ball nut from said bearing assembly.

2. The rack drive assembly according to claim 1 wherein said insulator is formed from rubber.

3. A rack drive assembly adapted for use in a vehicle electric power steering assembly comprising:

a steering member disposed in a rack housing and including a rack portion operatively connected to a vehicle steering wheel and a screw portion;

a ball nut assembly operatively connected to said screw portion of said rack portion of said steering member for effecting axial movement of said steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to said steering member;

an electric motor operatively connected to said rotor shaft by a pulley assembly; and wherein an insulator is molded in place between said ball nut and said rotor shaft during a molding process so as to operatively couple said ball nut to said rotor therewith and wherein said insulator is disposed between said outer surface of said ball nut and said inner surface of said rotor shaft to thereby isolate said ball nut from said bearing assembly.

4. A rack drive assembly adapted for use in a vehicle electric power steering assembly comprising:

a steering member disposed in a rack housing and including a rack portion operatively connected to a vehicle steering wheel and a screw portion;

a ball nut assembly operatively connected to said screw portion of said rack portion of said steering member for effecting axial movement of said steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to said steering member;

an electric motor operatively connected to said rotor shaft by a pulley assembly; and an insulator disposed between at least a portion of said outer surface of said ball nut and said inner surface of said rotor shaft to thereby isolate said ball nut from at least one of said pulley assembly and said bearing assembly and reduce the noise in said ball nut assembly;

wherein said rotor shaft includes a shoulder formed on an outer surface thereof, said shoulder spacing apart said bearing assembly and said pulley assembly; and wherein said bearing assembly is loaded by a member against said shoulder of said rotor shaft.

5. The rack drive assembly according to claim 4 wherein said insulator is disposed between said outer surface of said ball nut and said inner surface of said rotor shaft to thereby isolate said ball nut from said pulley assembly.

6. The rack drive assembly according to claim 4 wherein said insulator is disposed between said outer surface of said ball nut and said inner surface of said rotor shaft to thereby isolate said ball nut from said bearing assembly.

7. The rack drive assembly according to claim 4 wherein said insulator includes a first insulator disposed between said outer surface of said ball nut and said inner surface of said rotor shaft to thereby isolate said ball nut from said pulley assembly and a second insulator disposed between said outer surface of said ball nut and said inner surface of said rotor shaft to thereby isolate said ball nut from said bearing assembly.

8. The rack drive assembly according to claim 4 wherein said insulator is formed from rubber.

9. The rack drive assembly according to claim 4 wherein said pully assembly and said rotor shaft are keyed together for rotation.

10. A rack drive assembly adapted for use in a vehicle electric power steering assembly comprising:

a steering member disposed in a rack housing and including a rack portion operatively connected to a vehicle steering wheel and a screw portion;

a ball nut assembly operatively connected to said screw portion of said rack portion of said steering member for effecting axial movement of said steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to said steering member;

an electric motor operatively connected to said rotor shaft by a pulley assembly; and an insulator disposed between at least a portion of said outer surface of said ball nut and said inner surface of said rotor shaft to thereby isolate said ball nut from at least one of said pulley assembly and said bearing assembly and reduce the noise in said ball nut assembly;

wherein said insulator is molded in place between said ball nut and said rotor shaft during a molding process so as to operatively couple said ball nut to said rotor shaft for rotation therewith and where said pulley assembly and said rotor shaft are keyed together for rotation.

11. The rack drive assembly according to claim 10 wherein said insulator is disposed between said outer surface of said ball nut and said inner surface of said rotor shaft to thereby isolate said ball nut from said pulley assembly.

12. The rack drive assembly according to claim 10 wherein said insulator is disposed between said outer surface of said ball nut and said inner surface of said rotor shaft to thereby isolate said ball nut from said bearing assembly.

13. The rack drive assembly according to claim 10 wherein said insulator includes a first insulator disposed between said outer surface of said ball nut and said inner surface of said rotor shaft to thereby isolate said ball nut from said pulley assembly and a second insulator disposed between said outer surface of said ball nut and said inner surface of said rotor shaft to thereby isolate said ball nut from said bearing assembly.

14. The rack drive assembly according to claim 10 wherein said insulator is formed from rubber.

15. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, the vehicle electric power steering assembly including an electric motor operatively connected to the ball nut assembly by a pulley assembly, said ball nut assembly comprising:

a ball nut assembly operatively connected to the screw portion of the rack portion of the steering member for effecting axial movement of the steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to the steering member; and an insulator disposed between at least a portion of said outer surface of said ball nut and said inner surface of said rotor shaft to thereby isolate said ball nut from at least one of said pulley assembly and said bearing assembly and reduce the noise in said ball nut assembly;

wherein said insulator includes a first insulator disposed between said outer surface of said ball nut and said inner surface of said rotor shaft to thereby isolate said ball nut from said pulley assembly and a second insulator disposed between said outer surface of said ball nut and said inner surface of said rotor shaft to thereby isolate said ball nut from said bearing assembly.

16. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, the vehicle electric power steering assembly including an electric motor operatively connected to the ball nut assembly by a pulley assembly, said ball nut assembly comprising:

a ball nut assembly operatively connected to the screw portion of the rack portion of the steering member for effecting axial movement of the steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to the steering member; and an insulator disposed between at least a portion of said outer surface of said ball nut and said inner surface of said rotor shaft to thereby isolate said ball nut from at least one of said pulley assembly and said bearing assembly and reduce the noise in said ball nut assembly;

wherein said insulator is molded in place between said ball nut and said rotor shaft during a molding process so as to operatively couple said ball nut to said rotor shaft for rotation therewith, wherein said rotor shaft includes a shoulder formed on an outer surface thereof, said shoulder spacing apart said bearing assembly and the pulley assembly, and wherein said bearing assembly is loaded by a member against said shoulder of said rotor shaft.

17. The ball nut assembly according to claim 16 wherein said insulator is disposed between said outer surface of said ball nut and said inner surface of said rotor shaft to thereby isolate said ball nut from said bearing assembly.

18. The ball nut assembly according to claim 16 wherein said insulator is formed from rubber.

19. A rack drive assembly adapted for use in a vehicle electric power steering assembly comprising:

a steering member disposed in a rack housing and including a rack portion operatively connected to a vehicle steering wheel and a screw portion having an external thread convolution;

a ball nut assembly operatively connected to said screw portion of said rack portion of said steering member for effecting axial movement of said steering member upon rotation of a vehicle steering wheel, said ball nut assembly including a ball nut and a rotor shaft, said ball nut operatively coupled to said rotor shaft for rotation therewith, said ball nut including an outer surface and said rotor shaft including an inner surface;

a bearing assembly carried by said rotor shaft for rotatably supporting said ball nut assembly relative to said steering member;

an electric motor operatively connected to said rotor shaft by a pulley assembly; and an insulator formed from rubber and disposed between at least a portion of said outer surface of said ball nut and said inner surface of said rotor shaft to thereby isolate said ball nut from at said pulley assembly and said bearing assembly and reduce the noise in said ball nut assembly.

20. The rack drive assembly according to claim 19 wherein said insulator includes a first insulator disposed between said outer surface of said ball nut and said inner surface of said rotor shaft to thereby isolate said ball nut from said pulley assembly and a second insulator disposed between said outer surface of said ball nut and said inner surface of said rotor shaft to thereby isolate said ball nut from said bearing assembly.

21. The rack drive assembly according to claim 19 wherein said insulator is molded in place between said ball nut and said rotor shaft during a molding process so as to operatively couple said ball nut to said rotor shaft for rotation therewith.

* * * * *

UNITED STATES PATENT AND TRADEMARK OFFICE
CERTIFICATE OF CORRECTION

| | | |
|---|---|---|
| PATENT NO. | : 7,055,646 B2 | Page 1 of 1 |
| APPLICATION NO. | : 10/121233 | |
| DATED | : June 6, 2006 | |
| INVENTOR(S) | : Mark Bugosh | |

It is certified that error appears in the above-identified patent and that said Letters Patent is hereby corrected as shown below:

Column 6, Claim 1, Line 16, after "rotor" insert --shaft for rotation--.
Column 6, Claim 3, Line 43, after "rotor" insert --shaft for rotation--;
                Line 44, delete "is" and insert --includes a first insulator--;
                Line 47, after "said" insert --pulley assembly and a second insulator disposed between said outer surface of said ball nut and said inner surface of said rotor shaft to thereby isolate said ball nut from said--.
Column 7, Claim 10, Line 60, delete "where" and insert --wherein--.
Column 10, Claim 19, Line 13, delete "at" and insert --both--.

Signed and Sealed this

Fifteenth Day of August, 2006

JON W. DUDAS
*Director of the United States Patent and Trademark Office*